United States Patent
George et al.

(10) Patent No.: US 11,950,318 B2
(45) Date of Patent: Apr. 2, 2024

(54) INTELLIGENT MECHANISM TO IDENTIFY AND MANAGE COST OF IOT DEVICE LIFECYCLE

(71) Applicant: Aeris Communications, Inc., San Jose, CA (US)

(72) Inventors: Jins George, Fremont, CA (US); Leif Ronnie Pettersson, San Jose, CA (US); Subramanian Balakrishnan, Cupertino, CA (US)

(73) Assignee: Aeris Communications, Inc., San Jose, CA (US)

(*) Notice: Subject to any disclaimer, the term of this patent is extended or adjusted under 35 U.S.C. 154(b) by 0 days.

(21) Appl. No.: 18/065,216

(22) Filed: Dec. 13, 2022

(65) Prior Publication Data

US 2023/0188971 A1 Jun. 15, 2023

Related U.S. Application Data

(60) Provisional application No. 63/289,418, filed on Dec. 14, 2021.

(51) Int. Cl.
*H04W 8/18* (2009.01)
*G16Y 40/40* (2020.01)
*H04W 24/08* (2009.01)

(52) U.S. Cl.
CPC ............. *H04W 8/18* (2013.01); *H04W 24/08* (2013.01); *G16Y 40/40* (2020.01)

(58) Field of Classification Search
CPC ........ H04W 8/18; H04W 24/08; G16Y 40/10; G16Y 40/20; G16Y 40/30; G16Y 40/35; G16Y 40/40
See application file for complete search history.

(56) References Cited

U.S. PATENT DOCUMENTS 9,432,521 B1 * 8/2016 Bhagat .................. H04W 24/08
10,437,635 B2 10/2019 Layman
(Continued)

FOREIGN PATENT DOCUMENTS

WO 2021081282 4/2021

OTHER PUBLICATIONS

F. Tao, et al., "Internet of Things in Product Life-Cycle Energy Management", Mar. 2016, 14 pages., https://www.sciencedirect.com/science/article/pili/S2452414X16000030.

*Primary Examiner* — Sargon N Nano
(74) *Attorney, Agent, or Firm* — Shih IP Law Group, PLLC

(57) ABSTRACT

A computer-implemented method and system for managing IoT device lifecycle for IoT devices using cellular or wireless networks are disclosed. The method includes receiving network usage information for one or more devices operating on a cellular network; storing network usage information for the one or more devices operating on a cellular network; analyzing the stored data network information for the one or more devices as historical network usage information for each of the one or more devices operating on a cellular network; determining which of the one or more devices have not used cellular network for a pre-determined period of time, where the pre-determined period of time is learned based on the historical network usage information, or provided as one or more static threshold parameters; and recommending lifecycle changes for each of the one or more devices that have not used cellular network for the pre-determined period of time.

18 Claims, 6 Drawing Sheets

200

(56) References Cited

U.S. PATENT DOCUMENTS

| | | | |
|---|---|---|---|
| 10,499,281 B2* | 12/2019 | Austin | H04W 28/086 |
| 10,673,707 B2 | 6/2020 | Dhanabalan | |
| 10,771,533 B2 | 9/2020 | Burton | |
| 11,052,851 B1* | 7/2021 | Anvari | G16H 10/60 |
| 11,252,031 B2* | 2/2022 | Baird | H04L 12/2814 |
| 11,408,878 B2 | 8/2022 | Nagar | |
| 11,469,969 B2 | 10/2022 | Mopur | |
| 11,621,900 B2* | 4/2023 | Nolan | H04L 43/065 |
| | | | 709/224 |
| 11,683,685 B2* | 6/2023 | Smith | H04L 9/3236 |
| | | | 713/156 |
| 11,711,704 B1* | 7/2023 | Polaganga | H04W 48/12 |
| | | | 370/252 |
| 2012/0213098 A1* | 8/2012 | Sun | H04W 24/08 |
| | | | 370/252 |
| 2015/0278374 A1* | 10/2015 | Van De Poel | G06F 16/9535 |
| | | | 707/722 |
| 2017/0154111 A1 | 6/2017 | de Bayser | |
| 2018/0013831 A1* | 1/2018 | Dey | G08B 31/00 |
| 2018/0246926 A1 | 8/2018 | Altaf et al. | |
| 2019/0026212 A1* | 1/2019 | Verkasalo | H04L 67/535 |
| 2019/0271578 A1* | 9/2019 | Moeller | G06Q 10/083 |
| 2020/0082013 A1* | 3/2020 | Triplet | G06N 5/022 |
| 2020/0403744 A1* | 12/2020 | Guo | H04W 36/08 |
| 2020/0403991 A1* | 12/2020 | Sohail | H04L 63/1433 |
| 2021/0088494 A1* | 3/2021 | Nagar | G01N 31/229 |
| 2021/0215787 A1* | 7/2021 | Anvari | G01S 13/765 |
| 2021/0386964 A1* | 12/2021 | Youngblood | A47C 27/085 |
| 2021/0392195 A1 | 12/2021 | Herrick | |
| 2022/0029994 A1 | 1/2022 | Choyi | |
| 2022/0070178 A1 | 3/2022 | Lee | |
| 2022/0078872 A1 | 3/2022 | Shrestha | |
| 2022/0158951 A1* | 5/2022 | Dauneria | H04M 15/8214 |
| 2022/0191652 A1* | 6/2022 | Acker | H04W 4/06 |
| 2022/0338098 A1* | 10/2022 | Marupaduga | H04W 36/24 |
| 2022/0357939 A1* | 11/2022 | Ward | G16Y 30/00 |
| 2022/0398288 A1* | 12/2022 | Venkatraman | G06F 16/9035 |

\* cited by examiner

INTELLIGENT MECHANISM TO IDENTIFY AND MANAGE COST OF IOT DEVICE LIFECYCLE

CROSS-REFERENCE TO RELATED APPLICATIONS

Under 35 USC 119(e), this application claims priority to U.S. provisional application Ser. No. 63/289,418, entitled "INTELLIGENT MECHANISM TO IDENTIFY AND MANAGE COST OF IOT DEVICE LIFECYCLE", filed on Dec. 14, 2021, all of which is herein incorporated by reference in its entirety.

FIELD OF THE INVENTION

The embodiments described herein relate generally to cellular/wireless networks and more particularly to managing IoT device lifecycle for IoT devices using cellular/wireless networks.

BACKGROUND

In many Internet-of-Things (IoT)/Machine-to-Machine (M2M) solutions, it may be useful to collect network usage information about the IoT devices using cellular/wireless networks and make the collected information available to the customer for managing IoT device lifecycle.

SUMMARY

In one example embodiment, a computer implemented method for managing IoT device lifecycle for IoT devices using cellular or wireless networks is disclosed. The method includes receiving network usage information for one or more devices operating on a cellular network; storing the network usage information for the one or more devices operating on a cellular network; analyzing the stored network usage information for the one or more devices operating on a cellular network as historical network usage information for each of the one or more devices operating on a cellular network; determining which of the one or more devices have not used cellular network for a pre-determined period of time, where the pre-determined period of time is learned based on the historical network usage information, or provided as one or more static threshold parameters; and recommending lifecycle changes for each of the one or more devices that have not used cellular network for the pre-determined period of time.

In another example embodiment, a system for managing IoT device lifecycle for IoT devices using cellular or wireless networks is disclosed. The system includes one or more devices operating on a cellular network, a server including a processor and a storage database, wherein the server receives network usage information for the one or more devices operating on cellular network; stores network usage information for the one or more devices operating on a cellular network in the storage database; analyzes the stored network usage information for the one or more devices operating on a cellular network as historical network usage information for each of the one or more devices operating on a cellular network; determines which of the one or more devices have not used cellular network for a pre-determined period of time, where the pre-determined period of time is learned based on the historical network usage information, or provided as one or more static threshold parameters; and recommends lifecycle changes for each of the one or more devices that have not used cellular network for the pre-determined period of time.

In an embodiment, a non-transitory computer-readable medium for managing IoT device lifecycle for IoT devices using cellular or wireless networks is disclosed. The non-transitory computer-readable medium for managing IoT device lifecycle for IoT devices using cellular or wireless networks having executable instructions stored therein that, when executed, cause one or more processors corresponding to a system having one or more devices operating on a cellular network, a server including a processor and a storage database to perform operations including: receiving network usage information for the one or more devices operating on a cellular network; storing network usage information for the one or more devices operating on a cellular network; analyzing the stored network usage information for the one or more devices operating on a cellular network as historical network usage information for each of the one or more devices operating on a cellular network; determining which of the one or more devices have not used cellular network for a pre-determined period of time, where the pre-determined period of time is learned based on the historical network usage information, or provided as one or more static threshold parameters; and recommending lifecycle changes for each of the one or more devices that have not used cellular network for pre-determined period of time.

In an embodiment, the method further includes managing cellular subscription for one or more devices by automatically implementing the recommended life cycle changes.

In an embodiment, the system manages cellular subscription for one or more devices by automatically implementing the recommended life cycle changes.

In an embodiment, the non-transitory computer-readable medium further includes instructions for managing cellular subscription for one or more devices by automatically implementing the recommended life cycle changes.

DETAILED DESCRIPTION

Figure 1A:
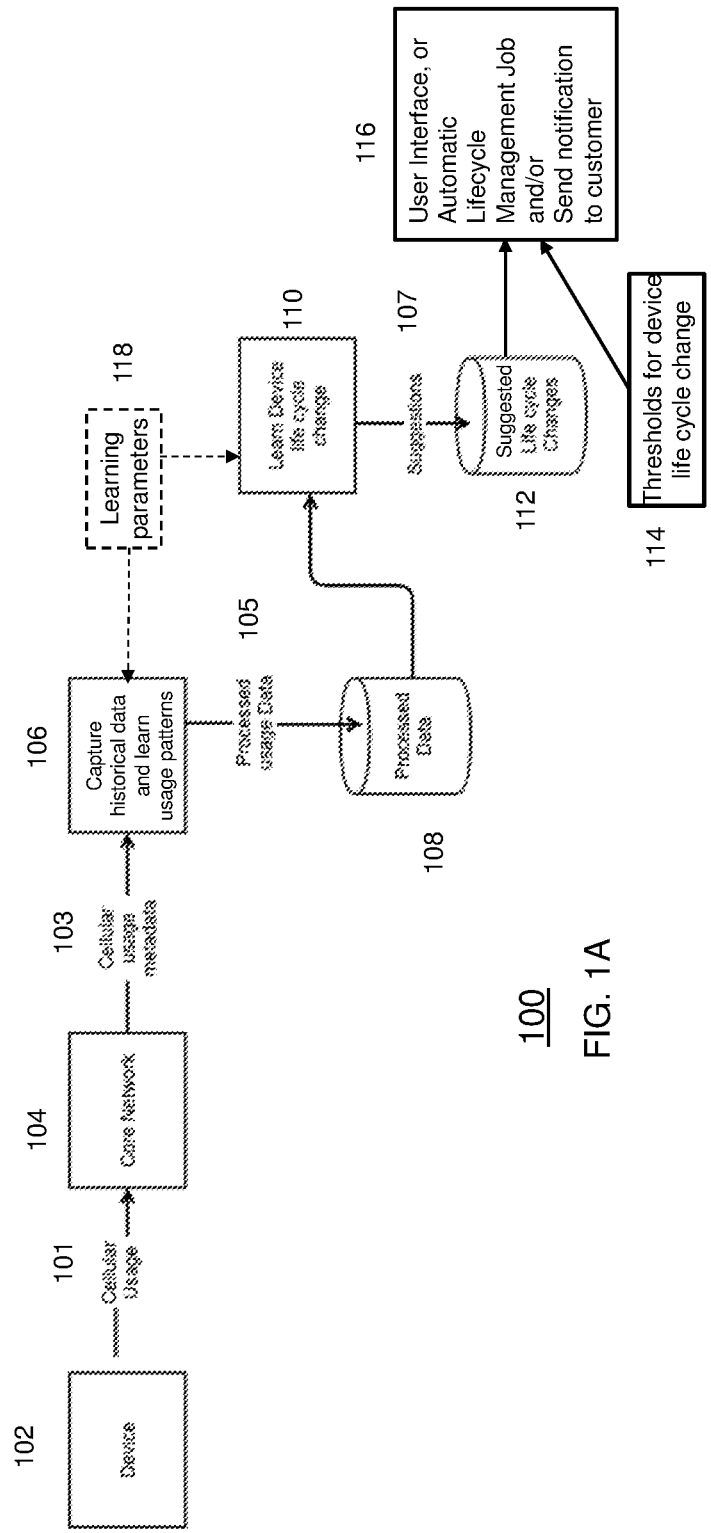
FIG. 1A is an overview diagram for system 100 and process used for managing IoT device lifecycle for IoT devices using cellular/wireless networks according to an embodiment described herein.

The embodiments described herein relate generally to cellular/wireless networks and more particularly to managing IoT device lifecycle for IoT devices using cellular/wireless networks. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

In many Internet-of-Things (IoT)/Machine-to-Machine (M2M) solutions, it may be useful to collect network usage information about the IoT devices using cellular/wireless networks and make the collected information available to the customer for managing IoT device lifecycle.

Organizations managing deployment of large scale IoT devices should have a good understanding of how their IoT devices are operating and their cellular/wireless network and/or data usage. Often it is very complex and time-consuming process to keep track of each device and manage their device lifecycle.

By combining automatic life cycle change detection and subscription management, the problem of managing devices that are being inactive, also referred to herein as non-performing assets based on their inactivity, may be solved in a simple and cost-effective way. The inactivity period for the devices may be determined as when the device(s) have not used cellular or wireless network services for data transfer for a pre-determined amount of time or when the device(s) have not connected to the cellular or wireless network for a pre-determined amount of time. This solution may be offered by mobile network operators (MNOs) and/or mobile virtual network operators (MVNOs) and/or third parties such as mobile virtual network enablers (MVNEs) involving detecting network usage pattern as the devices connect to the network and/or transfer data using the network services offered by the MNOs and/or MVNOs and/or MVNEs, and generating subscription change recommendations.

The solution may further include automatically managing cellular/wireless network subscription for one or more devices that have not used cellular network or other wireless network services.

It is almost impossible for a human to detect network usage patterns in network and/or data usage for large number of devices. By using machine learning algorithms like clustering, the system efficiently identifies the pattern of network and/or data usage and stores and uses it for life cycle change analysis of the IoT devices.

Thus, the method and system provided to the organizations may automatically learn the inactivity period and identify possible changes to the device life cycle. Additionally, an automated method for cellular/wireless network subscription management for large number of IoT devices, for example, batch processing, may also be provided. This may help save subscription costs for the organizations by managing device lifecycles for the devices that are being inactive. The inactivity period for the devices may be determined as when the device(s) have not used cellular or wireless network services for data transfer for a pre-determined period of time or when the device(s) have not connected to the cellular or wireless network for a pre-determined period of time, where the pre-determined period of time may include inactivity period learned based on the historical network usage information, or provided as one or more static threshold parameters.

In one example embodiment, a computer implemented method for managing IoT device lifecycle for IoT devices using cellular/wireless networks is disclosed. The method includes receiving network usage information for one or more devices operating on a cellular/wireless network; storing network usage information for the one or more devices operating on a cellular/wireless network; analyzing the stored network usage information for the one or more devices operating on a cellular/wireless network as historical network usage information for each of the one or more devices operating on a cellular network; determining which of the one or more devices have not used cellular/wireless network for a pre-determined period of time, where the pre-determined period of time is learned based on the historical network usage information, or provided as one or more static threshold parameters; and recommending lifecycle changes for each of the one or more devices that have not used cellular/wireless network for the pre-determined period of time.

In another example embodiment, a system for managing IoT device lifecycle for IoT devices using cellular/wireless networks is disclosed. The system includes one or more devices operating on a cellular/wireless network, a server including a processor and a storage database, wherein the server receives network usage information for the one or more devices operating on cellular/wireless network; stores network usage information for the one or more devices operating on a cellular/wireless network in the storage database; analyzes the stored network usage information for the one or more devices operating on a cellular/wireless network as historical network usage information for each of the one or more devices operating on a cellular/wireless network; determines which of the one or more devices have not used cellular/wireless network for a pre-determined period of time, where the pre-determined period of time is learned based on the historical network usage information, or provided as one or more static threshold parameters; and recommends lifecycle changes for each of the one or more devices that have not used cellular/wireless network for the pre-determined period of time.

In an embodiment, a non-transitory computer-readable medium for managing IoT device lifecycle for IoT devices using cellular/wireless networks is disclosed. The non-transitory computer-readable medium for managing IoT device lifecycle for IoT devices using cellular/wireless networks having executable instructions stored therein that, when executed, cause one or more processors corresponding to a system having one or more devices operating on a cellular/wireless network, a server including a processor and a storage database to perform operations including: receiving network usage information for the one or more devices operating on a cellular/wireless network; storing network usage information for the one or more devices operating on a cellular/wireless network; analyzing the stored network usage information for the one or more devices operating on a cellular/wireless network as historical network usage information for each of the one or more devices operating on a cellular/wireless network; determining which of the one or more devices have not used cellular/wireless network for a pre-determined period of time, where the pre-determined period of time is learned based on the historical network usage information, or provided as one or more static threshold parameters; and recommending lifecycle changes for each of the one or more devices that have not used cellular/wireless network for the pre-determined period of time.

In an embodiment, the method further includes managing cellular subscription for one or more devices by automatically implementing the recommended life cycle changes.

In an embodiment, the system manages cellular subscription for one or more devices by automatically implementing the recommended life cycle changes.

In an embodiment, the non-transitory computer-readable medium further includes instructions for managing cellular subscription for one or more devices by automatically implementing the recommended life cycle changes.

Cellular/wireless network and/or data usage activity of the IoT devices is captured by various core network elements, for example, authentication, authorization, and accounting (AAA) server, home location register (HLR), home subscriber server (HSS), Session Management Function (SMF), etc. These records may consist of bytes in/out used by the IoT Device during a particular data session as well as authentication history every time the device attaches to the network. This network and/or data usage activity is further processed periodically, for example, hourly/daily/weekly/monthly/yearly, etc. and stored in one or more databases for learning and analysis to detect device life cycle changes. Device life cycle change detection may happen in two ways: 1. Static inactivity period threshold-based detection: In this method, the system keeps track of the network and/or data usage history and looks for devices that have not used the network and/or cellular data/SMS/Voice data over a configurable period of time. If there is no activity, then the device is flagged for a life cycle change; and 2. Automatic learning of inactivity period based on historical network and/or data usage pattern and decide if the life cycle changes are needed: In this method, system learns the inactivity period of each device using machine learning model and provides or uses learned criteria to recommend device life-cycle change.

The static as well as learned criteria from historical network usage pattern may include one or more thresholds, for example, if no activity for a period X: suspend the device, and if the device is suspended for a period Y: de-activate or cancel the device; or for example, if no activity for period A: suspend the device, and if the device is suspended for a period B: de-activate or cancel the device, or cancel the device if no activity for period D, etc. Device life cycle change detection may also be achieved using a combination of static inactivity period threshold-based detection and automatic learning of inactivity period based on historical network and/or data usage pattern and decide if the life cycle changes are needed.

For example, if an IoT device is supposed to detect low battery on an equipment and report it to a remote server, this device uses cellular data only when the battery level drops below certain volts. Assuming that such an activity happens once in a month, the method and system provided herein may learn this pattern via machine learning, and store the typical frequency of data usage in the database. If such a device stops communicating to the server for longer than one month, then the system may flag it as a candidate for life cycle changes or if the interval is huge, system may suggest or recommend subscription change.

Similarly, for cellular authentication data or control plane data, for example, if an IoT device is supposed to detect low battery on an equipment and report it to a remote server, this device connects to the cellular or wireless network only when the battery level drops below certain volts. Assuming that such an activity happens once in a month, the method and system provided herein may learn this pattern via machine learning, and store the typical frequency of network usage in the database. If such a device stops communicating to the server for longer than one month, then the system may flag it as a candidate for life cycle change or if the interval is huge, system may suggest or recommend subscription change.

FIG. 1A is an overview diagram for system 100 and process used for managing IoT device lifecycle for IoT devices using cellular/wireless networks according to an embodiment described herein. For example, the system 100 for managing IoT device lifecycle for IoT devices using cellular/wireless networks may include one or more devices 102 operating on a cellular network, a server 106 including a processor and a storage database. The server may be a physical server or located in cloud. Although the server is shown here to include a processor and a storage database, the storage database may be at a location same as or different from the processor.

The server 106 receives data usage information also known as cellular usage metadata 103 for one or more devices 102 operating on cellular network from the core network elements 104. Thus, in an embodiment, server 106 captures historical data and learns patterns from the received data usage information. The core network elements 104 collect this cellular/wireless network usage data 101 information as the device(s) 102 operate on the network during their normal course of operation. The cellular usage metadata as used herein may refer to any one or more of: packet data usage, SMS usage, voice data usage or cellular registration usage.

The server 106 stores the cellular usage metadata 103, also known as data usage information, for one or more devices 102 operating on a cellular network in the storage database 108 as processed usage data 105, and analyzes the stored data usage information for one or more devices 102 operating on a cellular network as historical data usage information for each of the one or more devices 102 operating on a cellular network as learned device life cycle change 110. This is achieved by learning device usage pattern and using that information to suggest or recommend device life cycle change via step 112. The data may also be analyzed to see if there are any expected or unexpected seasonal dips in the usage, for example, different data usage during summer or winter etc.

Additionally, customer preferences may be provided as learning parameters 118 to the system including, but not limited to, any one or more of: suspending the device based on cellular usage metadata, first suspending the device based on cellular usage metadata and then canceling the device based on period of suspension, etc.

The system then determines which devices have not used cellular/wireless network for data transfer for a pre-determined period of time, where the pre-determined period of time is learned based on the historical network usage information; and recommends lifecycle changes for the one or more devices that have not used cellular network for data transfer for the pre-determined period of time. The pre-determined period of time may include any of, an hour, a day, a week, a month, a year, or a combination thereof. Additionally, or alternatively, in an embodiment, the pre-determined period of time may be provided as one or more static threshold parameters.

The recommended lifecycle changes for the one or more devices include any of: suspending the devices that have not used cellular network for data transfer for a pre-determined period of time, where the device has not used cellular network for data transfer but tries to register every once in a while, deactivating the devices that have been suspended for a determined period of time, and/or de-activating the devices that have not even tried to register on the cellular network during the pre-determined period of time.

The inactivity period for the devices may be determined as when the device(s) have not used cellular or wireless network services for data transfer for a period of time, when the devices have been suspended for a period of time, or when the device(s) have not connected to the cellular or wireless network for a period of time, when the devices have been suspended for a period of time, etc.

Figure 1B:
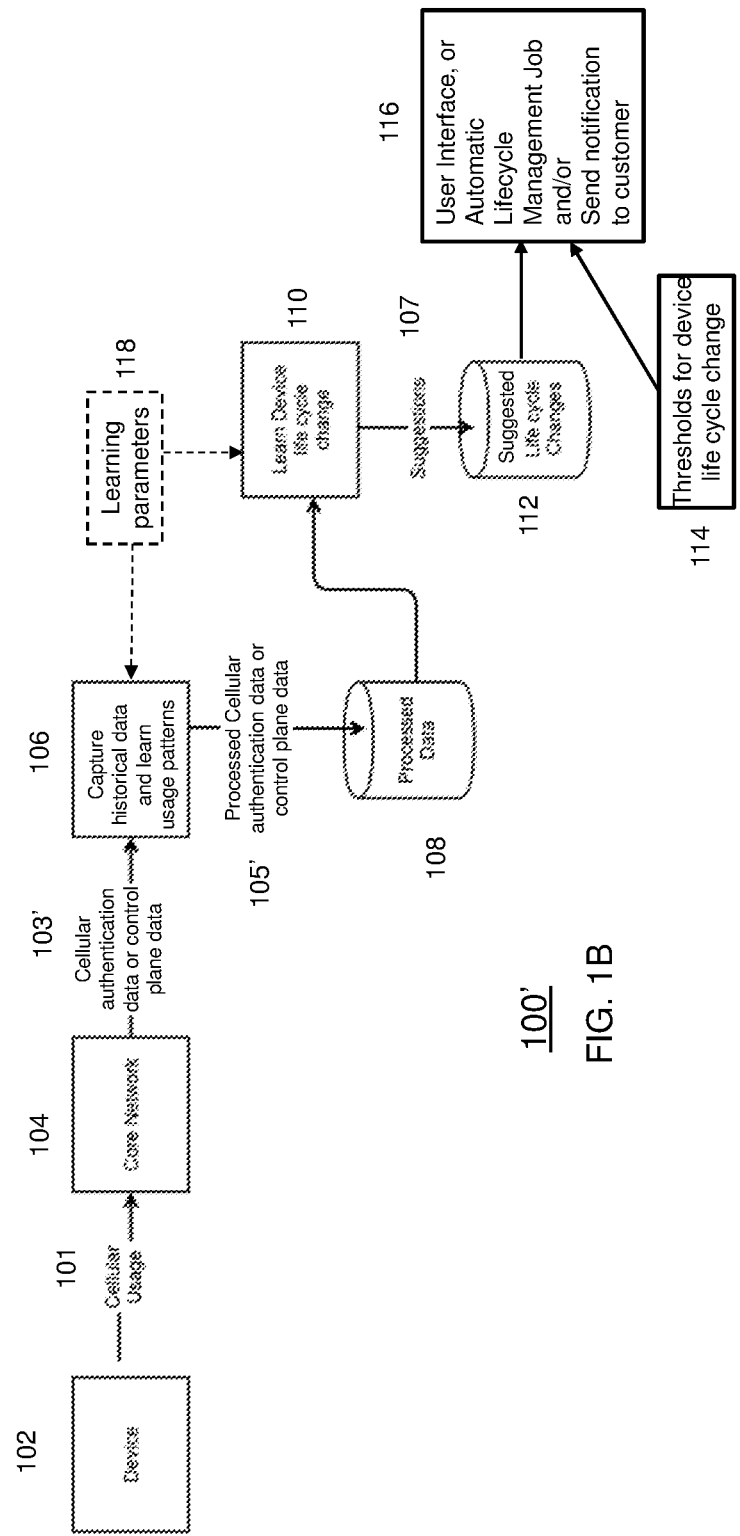
FIG. 1B is an overview diagram for system 100' and process used for managing IoT device lifecycle for IoT devices using cellular/wireless networks according to an embodiment described herein.

Additionally or alternatively, in an embodiment, the suspended device may be recommended for cancellation or may be canceled automatically, also referred to herein as deactivated, based on the analyses of the information available from the core network 104 as cellular authentication data or control plane data, as illustrated by FIG. 1B. Similar to the description accompanying FIG. 1A, in an embodiment, server 106 captures historical data and learns patterns from the received cellular authentication data or control plane data information 103'. The server 106 stores the cellular usage data 10, also known as authentication data or control plane data, for one or more devices 102 operating on a cellular network in the storage database 108 as processed cellular authentication data or control plane data 105' and analyzes the stored cellular authentication data or control plane data for one or more devices 102 operating on a cellular network as historical cellular usage information for each of the one or more devices 102 operating on a cellular network as learned device life cycle change 110. This is achieved by learning device network usage pattern and using that information to suggest or recommend device life cycle change via step 112. The data may also be analyzed to see if there are any expected or unexpected seasonal dips in the usage, for example, different data usage during summer or winter etc.

Additionally, customer preferences may be provided as learning parameters 118 to the system including, but not limited to, any one or more of: suspending the device based on cellular authentication data, canceling the device based on cellular authentication data, or first suspending the device based on cellular authentication data and then canceling the device based on period of suspension, etc.

Even if the device is already suspended, if the device attempts to register, or if the device is not even trying to register on the cellular network, such information can be obtained from cellular authentication data or control plane data for that device, for example, from home location register (HLR), the device may be recommended for a life-cycle change such as suspension or deactivation based on the cellular authentication data or control plane data for that device.

Figures 1C, 1D:
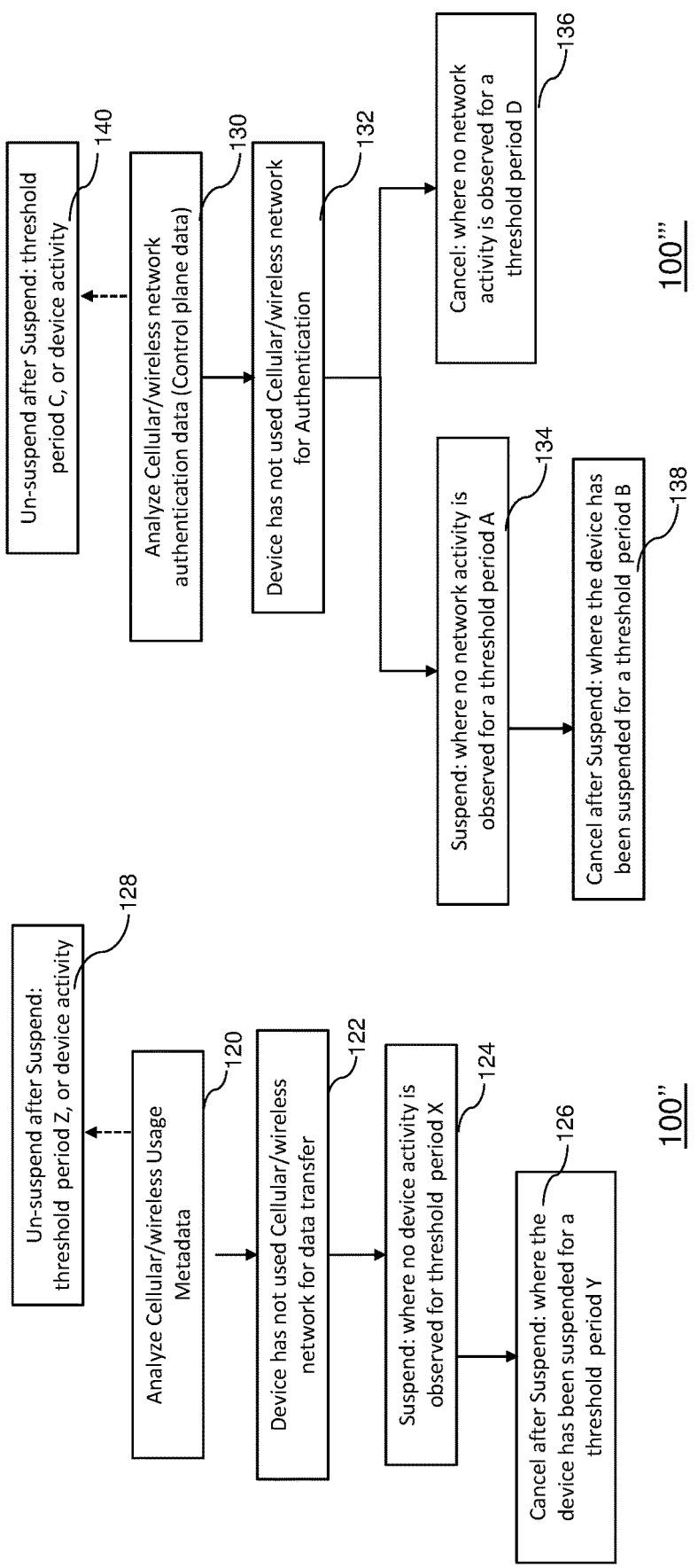
FIG. 1C illustrates various example criteria that may be used to recommend and/or implement one or more life cycle changes for one or more devices according to one or more embodiments of the present invention.
FIG. 1D illustrates various example criteria that may be used to recommend and/or implement one or more life cycle changes for one or more devices according to one or more embodiments of the present invention.

Additionally, or alternatively, in an embodiment, different threshold-based criteria may be provided for first suspending the device and then de-activating or canceling the device, for example, suspend the device that has not used cellular network for data transfer for a pre-determined period of time X and deactivate or cancel the device that has been suspended for a pre-determined period of time Y as illustrated by steps 114 and 116 in FIGS. 1A and 1B, and described in detail in the description accompanying FIGS. 1C and 1D, and illustrated by FIGS. 1C and 1D.

The system then determines which devices have not used cellular/wireless network for a pre-determined period of time, where the pre-determined period of time is learned based on the historical network usage information; and recommends lifecycle changes for the one or more devices that have not used cellular network for the pre-determined period of time. Additionally, or alternatively, in an embodiment, the pre-determined period of time may be provided as one or more static threshold parameters. The pre-determined period of time may include any of, an hour, a day, a week, a month, a year, or a combination thereof.

In an embodiment, the one or more devices that have been suspended based on no activity, may also be brought back on billing cycle based on a pre-determined criteria, for example, period of time, or network activity of the one or more suspended devices. For example, where the IoT devices are used for businesses that are periodic in nature, such as but not limited to agriculture, where the IoT solution may be utilized only during the growing season and suspended when not in use, such as during winter months, and unsuspended when the growing season resumes.

Thus, the method for managing IoT device lifecycle using cellular/wireless networks according to one or more embodiments described herein includes receiving network usage information for one or more devices operating on a cellular network; storing network usage information for the one or more devices operating on a cellular network; analyzing the stored network usage information for the one or more devices operating on a cellular network as historical network usage information for each of the one or more devices operating on a cellular network; determining which of the one or more devices have not used cellular network for a pre-determined period of time, where the pre-determined period of time is learned based on the historical network usage information, or provided as one or more static threshold parameters; and recommending lifecycle changes for the one or more devices that have not used cellular network for the pre-determined period of time.

User or manager of the IoT devices may be notified of the life cycle change recommendation for the one or more devices via user interface. The user/manager may choose any of the presented options or no change in the device life-cycle via user interface.

The method may further include automatically implementing the recommended life cycle change by managing cellular/wireless subscription for one or more devices that have not used cellular/wireless network for data transfer. Automatically managing cellular/wireless subscription for the one or more devices that have not used cellular/wireless network for data transfer includes any of: suspending the one or more devices that have not used cellular network for data transfer, de-activating the one or more devices that have not used cellular network for data transfer, or a combination thereof. For example, suspend the device that has not used cellular network for data transfer for the pre-determined period of time, for example, threshold X, and then deactivate the device that has been suspended for a pre-determined period of time, for example, threshold Y, as illustrated in FIGS. 1A, 1C, and 2B, or not changing the device life cycle based on a pre-defined criteria.

Figure 2A:
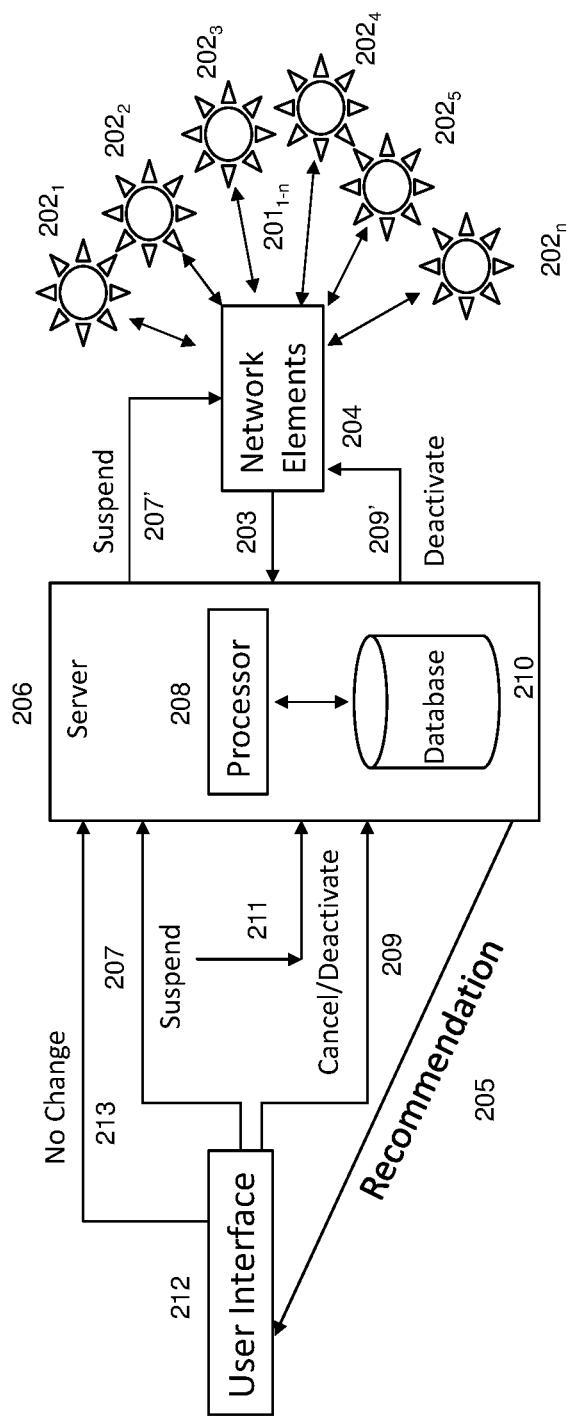
FIG. 2A illustrates a system and process 200 used for managing IoT device lifecycle for IoT devices using cellular/wireless networks according to an embodiment described herein.
Figure 2B:
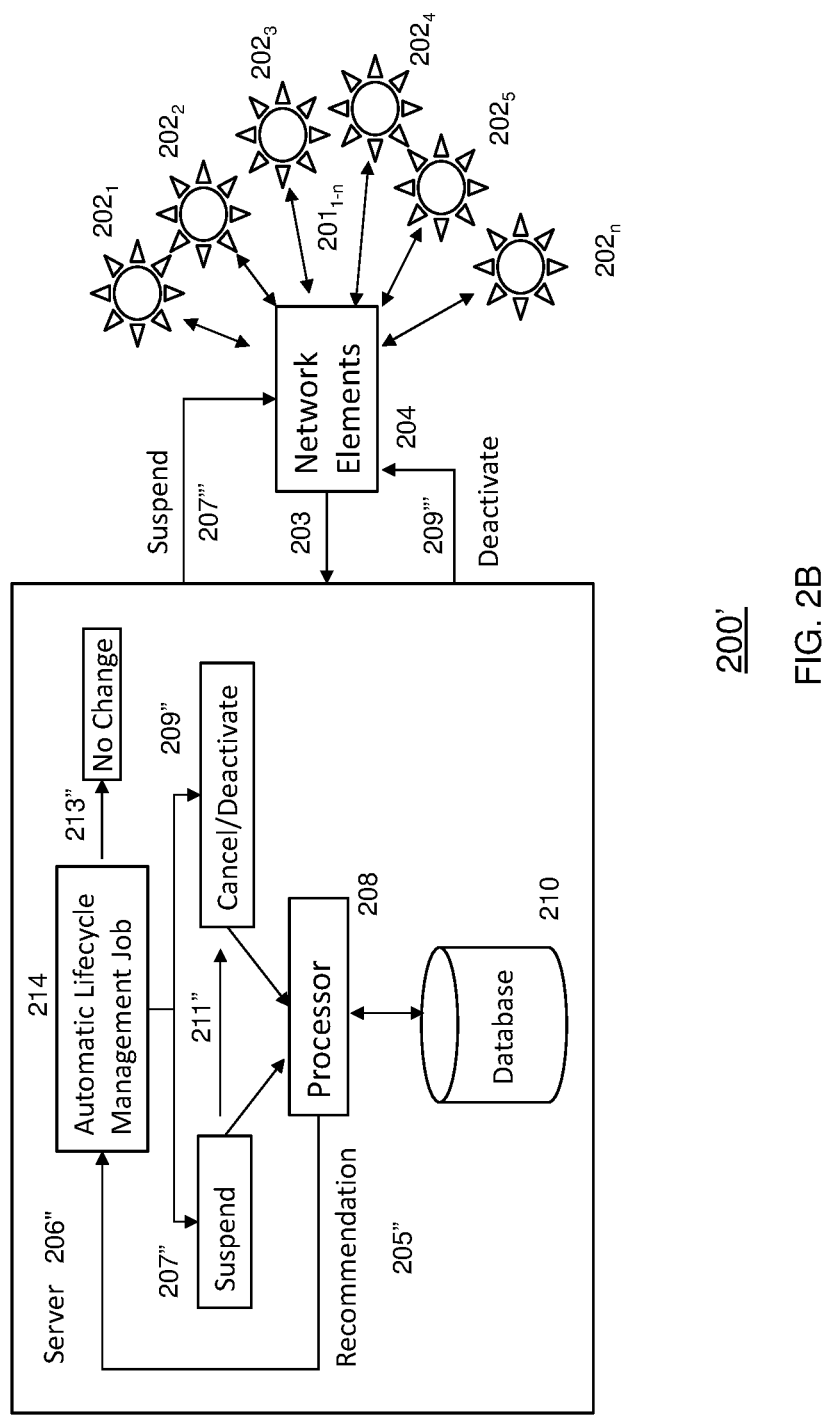
FIG. 2B illustrates a system and process 200' used for managing IoT device lifecycle for IoT devices using cellular/wireless networks according to an embodiment described herein.

Similarly, the method may further include automatically implementing the recommended life cycle change by managing cellular/wireless subscription for one or more devices that have not used cellular/wireless network, where automatically managing cellular/wireless subscription for the one or more devices that have not used cellular/wireless network includes any of: suspending the one or more devices that have not used cellular network for the pre-determined period of time, for example, threshold A, or deactivate or cancel the one or more devices that have not used cellular network for the pre-determined period of time, for example, threshold D, or first suspend the one or more devices that have not used cellular/wireless network for the pre-determined period of time, for example, threshold A, and then deactivate the one or more devices that have not used cellular/wireless network for a pre-determined period of time, for example, threshold B, as illustrated in FIGS. 1B, 1D, and 2B, or not changing the device life cycle based on a pre-determined criteria.

The system and process may additionally provide bulk device life cycle changes for example, once the system identifies the devices for life cycle changes, it may recommend such changes to human users or may perform these changes automatically via automatic life-cycle management job as illustrated in FIG. 2B and described in detail in the description accompanying FIG. 2B. The life cycle changes recommended and/or performed may include: suspending the one or more devices or de-activating the one or more devices, or not changing the device life cycle. Suspending allows the devices to re-activated again at a later point of time whereas de-activate removes the device from cellular network, hence de-activating the device is also referred to herein as canceling the device.

Additionally or alternatively, when a device is suspended, deactivated or un-suspended/re-activated via autoprocess job, also referred to herein as automatic lifecycle management job, by automatically implementing the recommended life cycle change, a notification of the device lifecycle change may be sent to the customer/user via step 116 as illustrated in FIGS. 1A and 1B.

FIG. 1C illustrates various example criteria that may be used to recommend and/or implement one or more life cycle changes for one or more devices according to one or more embodiments of the present invention. For example, for a device that has not used cellular network for data transfer 122 based on analysis of cellular usage metadata 120 for a pre-determined period of time, for example, threshold X, may be suspended via step 124, and the device that has been suspended for a pre-determined period of time, for example, threshold Y, may be deactivated via step 126.

Various decisions described above may be reached using customer preferences which may be provided as learning parameters to the system, as described in the description accompanying FIG. 1A, including, but not limited to, any one or more of: suspending the device based on cellular usage metadata, first suspending the device based on cellular usage metadata and then canceling the device based on period of suspension, etc.

FIG. 1D illustrates various example criteria that may be used to recommend and/or implement one or more life cycle changes for one or more devices according to one or more embodiments of the present invention. For example, for a device that has not used cellular/wireless network 132 based on analysis of cellular/wireless authentication data or control plane data 130 for a pre-determined period of time, for example, threshold A, may be suspended via step 134, or the device that has not used cellular/wireless network for the pre-determined period of time, for example, threshold D, may be deactivated or canceled via step 136. Alternatively, for a device that has not used cellular/wireless network 130 based on analysis of cellular/wireless authentication data or control plane data 132 for a pre-determined period of time, for example, threshold A, may be first suspended via step 134, and then deactivated if the device has been suspended for a pre-determined period of time, for example, threshold B, via step 138, or no change in the device life cycle may be recommended based on a pre-defined criteria.

Various decisions described above may be reached using customer preferences which may be provided as learning parameters to the system, as described in the description accompanying FIG. 1B, including, but not limited to, any one or more of: suspending the device based on cellular authentication data, canceling the device based on cellular authentication data, or first suspending the device based on cellular authentication data and then canceling the device based on period of suspension, etc.

In an embodiment, the devices that are suspended as illustrated in FIGS. 1A-D, 2A and 2B may be un-suspended also referred to herein as re-activated based on a pre-defined criteria, for example, device activity, or after a threshold period of time, for example, Z or C as illustrated in FIGS. 1C and 1D respectively.

Although different threshold periods are described herein as A, B, C, D, . . . X, Y, Z, . . . etc., a person skilled in the art may readily understand that they can be same or different and may correspond to hour(s), week(s), month(s), year(s), etc.

FIG. 2A illustrates a system and process 200 used for managing IoT device lifecycle for IoT devices using cellular/wireless networks according to an embodiment described herein. For example, the system 200 for managing IoT device lifecycle for IoT devices using cellular/wireless networks may include one or more devices $202_{1-n}$ operating on a cellular network, and a server 206 including a processor 208 and a storage database 210. The server may be a physical server or located in cloud. Although the server is shown here to include a processor and a storage database, the storage database may be at a location same as or different from the processor.

The server 206 receives network and/or data usage information 203 for one or more devices $202_{1-n}$ operating on cellular network from the core network elements 204. Thus, in an embodiment, server 206 captures historical network and/or data and learns patterns from the received network and/or data usage information. For example, the data usage information is obtained as cellular usage metadata and the network usage information may be obtained as cellular authentication data or control plane data.

The core network elements 204 collect this cellular/wireless network and/or usage data 201 information as the devices $202_{1-n}$ operate on the network during their normal course of operation. The cellular usage metadata as used herein may include any one or more of: packet data usage, SMS usage, voice data usage or cellular registration usage. The cellular authentication data or control plane data may include cellular authentication data from network elements such as but not limited to home location register (HLR) when the device tries to connect to the cellular/wireless network.

The server 206 stores the network and/or data usage information, for one or more devices 202 operating on a cellular network in the storage database 210 via step 203, and analyzes the stored network and/or data usage information for one or more devices $202_{1-n}$ operating on a cellular network as historical network and/or data usage information and/or patterns for each of the one or more devices $202_{1-n}$ operating on a cellular network as learned device life cycle change. The data may also be analyzed to see if there are any expected or unexpected seasonal dips in the usage, for example, different data usage during summer or winter etc.

The system 200 then determines which devices out of $202_{1-n}$ have not used cellular/wireless network for data transfer for a pre-determined period of time, where the pre-determined period of time is learned based on the historical network usage information; and recommends lifecycle changes for the one or more devices that have not used cellular network for data transfer for the pre-determined period of time via user interface 212 via step 205. Additionally, or alternatively, in an embodiment, the pre-determined period of time may be provided as one or more static threshold parameters. The pre-determined period of time may include any of, an hour, a day, a week, a month, a year, or a combination thereof.

The recommended lifecycle changes for the one or more devices may include any of: suspending the one or more devices that have not used cellular network for the pre-determined period of time for data transfer via step 207, suspending the one or more devices that have not used cellular network for the pre-determined period of time via step 207, deactivating the one or more devices that have been suspended for a pre-determined period of time via step 211, de-activating the one or more devices that have not used cellular network for a pre-determined period of time via step 209, thus changing the cellular subscription to suspend the one or more devices or to cancel the one or more devices in the database. For example, the method and system described herein may recommend any one more of: suspend a device that has not used cellular network for data transfer for a pre-determined period of time based on cellular usage metadata, where the device has not used cellular network for data transfer but tries to register every once in a while via step 207, or deactivate (cancel) the device that has not even tried to register on the cellular network during a pre-determined period of time via step 209 based on cellular authentication or control plane data; or first suspend the device that has not used cellular network for data transfer a pre-determined period of time via step 207 based on cellular usage metadata and then deactivate the device that has been suspended for a pre-determined period of time via step 211; or first suspend the device that has not used cellular network a pre-determined period of time via step 207 based on cellular authentication or control plane data and then deactivate the device that has been suspended for a pre-determined period of time via step 211 as illustrated in FIGS. 1A, 1B, 1C, 1D, and 2A, or not changing the device life cycle via step 213, based on a pre-determined criteria.

These may be presented to the user/manager of the IoT device(s) via user interface 212 and may be chosen by the user via user interface 212 and then carried out by the system via steps 207' or 209'. The user/manager may choose any of the presented options or no change via user interface 213. Various examples of different criteria for suspending and/de-activating the one or more devices are illustrated in FIGS. 1C and 1D and are described in detail in the description accompanying FIGS. 1C and 1D.

The inactivity period for the devices may be determined as when the device(s) have not used cellular or wireless network services for data transfer for a period of time, when the devices have been suspended for a period of time, or when the device(s) have not connected to the cellular or wireless network for a period of time, when the devices have been suspended for a period of time, etc.

Additionally, or alternatively, in an embodiment, different criteria may be provided for first suspending the device and then de-activating or canceling the device, for example, suspend the device that has not used cellular network for data transfer for a pre-determined period of time X via step 207 and deactivate the device that has been suspended for a pre-determined period of time Y via step 209, also illustrated in FIG. 1C, and described in detail in the description accompanying FIG. 1C.

Similarly, in an embodiment, different criteria may be provided for first suspending the device and then de-activating or canceling the device, for example, suspend the device that has not used cellular network for a pre-determined period of time A via step 207 and deactivate the device that has been suspended for a pre-determined period of time B via step 209, also illustrated in FIG. 1D, and described in detail in the description accompanying FIG. 1D.

Thus, the method for managing IoT device lifecycle for IoT devices using cellular/wireless networks according to one or more embodiments described herein includes receiving data network information for one or more devices operating on a cellular network; storing network usage information for one or more devices operating on a cellular network; analyzing the stored network usage information for one or more devices operating on a cellular network as historical network usage information and/or pattern for each of the one or more devices operating on a cellular network; determining which devices have not used cellular network for a pre-determined period of time, where the pre-determined period of time is learned based on the historical network usage information, or provided as one or more static threshold parameters; and recommending lifecycle changes for the one or more devices that have not used cellular network for the pre-determined period of time.

User or manager of the IoT device may be notified of the life cycle change recommendation for the one or more devices via user interface. The user/manager may choose any of the presented options or no change via user interface 212.

The method may further include automatically managing cellular subscription for devices that have not used cellular network without any further user input by automatically implementing the recommended device life cycle change as illustrated in FIG. 2B.

As illustrated in FIG. 2B, automatically managing cellular subscription for devices that have not used cellular network may include any of: suspending the one or more devices that have not used cellular network for a pre-determined period of time for data transfer via step 207", suspending the one or more devices that have not used cellular network for a pre-determined period of time via step 207", de-activating the one or more devices that have not used cellular network for a pre-determined period of time via step 209", de-activating the one or more devices that have been suspended for a pre-determined period of time via step 209", or a combination thereof.

For example, the method and system described herein may provide recommendations 205" to an automatic lifecycle management job 214 to include any one of: suspend the device that has not used cellular network for a pre-determined period of time for data transfer via step 207", or deactivate the device that has not used cellular network for a pre-determined period of time via step 209"; or first suspend the device that has not used cellular network for a pre-determined period of time via step 207" and then deactivate the device that has been suspended for a pre-determined period of time via step 211", or first suspend the device that has not used cellular network for data transfer for a pre-determined period of time via step 207" and then deactivate the device that has been suspended for a pre-determined period of time via step 211" as illustrated in FIGS. 1C, 1D and 2B, or not changing the device life cycle via step 213. These recommended lifecycle changes may then be automatically implemented by automatic lifecycle management job.

The automatic lifecycle management job 214, also referred to herein as auto-process job, may be thus used to implement the recommended life-cycle change, for example, to suspend or to deactivate the one or more devices. The one or more devices may then be suspended and/or canceled/deactivated through the network elements 204 via steps 207''' or 209''' respectively. Although, automatic lifecycle management job 214 is shown as a separate functional element within the server 206", it may be part of the processor 208 that performs the function of suspending or canceling/deactivating the device via network elements 204 once the device life cycle change illustrated in FIGS. 1A and 1B is learned. Although, automatic lifecycle management job 214 is shown as a functional element within server 206", it can also be a separate functional unit from server 206". In an embodiment, this process may be performed for individual device or for a batch of devices.

Therefore, in an embodiment, the automatic lifecycle management job 214, also referred to herein as auto-process job, may automatically implement the recommended life cycle changes by managing cellular subscription for one or more devices.

Various examples of different criteria for suspending and/de-activating the devices based on cellular data usage and cellular authentication or control plane data are illustrated in FIGS. 1C and 1D, and are described in the description accompanying FIGS. 1C and 1D respectively. These criteria may be provided as pre-defined/pre-determined criteria or may be learned by the system using historical data and machine learning.

The predefined/pre-determined criteria may include any one or a combination of: 1. static inactivity period threshold-based detection; and 2. automatic learning of inactivity period based on historical network usage pattern and decide if the life cycle changes are needed. In static inactivity period threshold-based detection the system keeps track of the network/data usage history, for example, last usage time stamp, and looks for devices that have not used the cellular data/SMS/Voice over a configurable period of time, referred to herein as thresholds. If there is no activity for the configured or pre-determined period of time, then the device is flagged for a life cycle change. In automatic learning of inactivity period based on historical network usage pattern and decide if the life cycle changes are needed, the system learns the inactivity period of each device using machine learning model as described above in the description accompanying FIGS. 1A and 1B and provides/uses the learned criteria to recommend device life-cycle change.

The static as well as learned criteria may include one or more thresholds, for example, if no activity for a period X: suspend the device, and if the device is suspended for a period Y: de-activate or cancel the device; or for example, if no activity for period A: suspend the device, and if the device is suspended for a period B: de-activate or cancel the device, or cancel the device if no activity for period D, etc.

Thus, in an embodiment, the one or more devices may be automatically suspended and/or cancelled based on the current state of each of the one or more devices. For example, automatically suspending a device that has not used cellular network for data transfer for a pre-determined period of time, where the device has not used cellular network for data transfer for a pre-determined period of time but tries to register every once in a while, via steps 207" and 207''', automatically suspending a device that has not used cellular network for a pre-determined period of time via steps 207" and 207''', automatically deactivating (canceling) the device that has not even tried to register on the cellular network during a pre-determined period of time via steps 209" and 209''', or automatically deactivating (canceling) the device that has been suspended for a pre-determined period of time via steps 209" and 209'''.

The device that has not used cellular network for data transfer for a pre-determined period of time may be suspended based on usage data, or if the device is already suspended, it may be de-activated based on a pre-determined criteria. Additionally or alternatively, based on cellular authentication data or control plane data, the device may be suspended or cancelled/deactivated based on pre-determined criteria.

In an embodiment, this process may be performed as a streaming job which may be running in background, which may take very low processing power and go through millions of devices. When one or more devices are found to satisfy the pre-determined criteria for the device life-cycle change, the method and system described herein may suggest and/or implement the life-cycle change for those devices based on pre-defined criteria.

The system and process may additionally provide bulk device life cycle changes for example, once the system identifies the devices for life cycle changes, it may recommend such changes to human users or may perform these changes automatically for that batch of devices. The life cycle changes recommended and/or performed may include suspending the devices, de-activating the devices, or not changing the device life cycle. Suspending allows the devices to re-activated (un-suspend) again at a later point of time whereas de-activate cancels and removes the device from cellular network.

Figure 3:
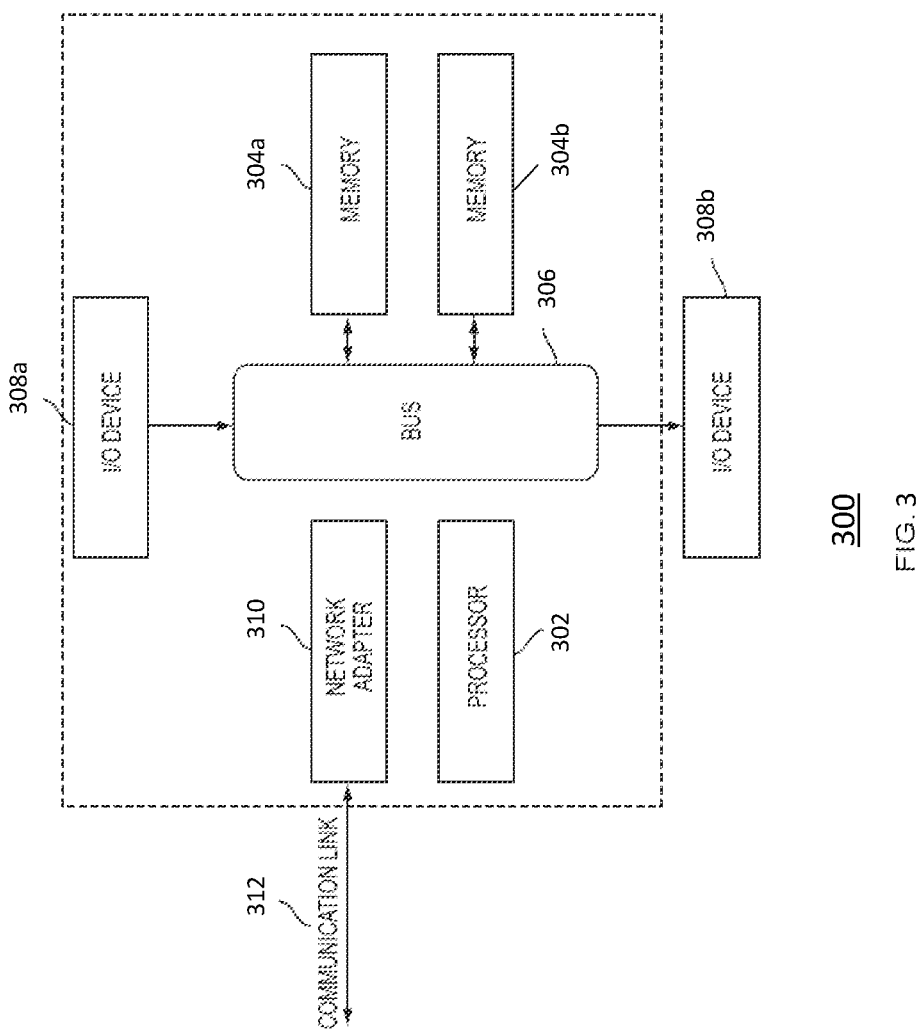
FIG. 3 illustrates a data processing system 300 suitable for storing the computer program product and/or executing program code relating to managing IoT device lifecycle for IoT devices using cellular/wireless networks in accordance with an embodiment described herein.

FIG. 3 illustrates a data processing system 300 suitable for storing the computer program product and/or executing program code in accordance with an embodiment of the present invention. The data processing system 300 includes a processor 302 coupled to memory elements 304a-b through a system bus 306. In other embodiments, the data processing system 300 may include more than one processor and each processor may be coupled directly or indirectly to one or more memory elements through a system bus.

Memory elements 304a-b can include local memory employed during actual execution of the program code, bulk storage, and cache memories that provide temporary storage of at least some program code in order to reduce the number of times the code must be retrieved from bulk storage during execution. As shown, input/output or I/O devices 308a-b (including, but not limited to, keyboards, displays, pointing devices, etc.) are coupled to the data processing system 300. I/O devices 308a-b may be coupled to the data processing system 300 directly or indirectly through intervening I/O controllers (not shown).

In FIG. 3, a network adapter 310 is coupled to the data processing system 302 to enable data processing system 302 to become coupled to other data processing systems or remote printers or storage devices through communication link 312. Communication link 312 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "communication" is understood to include various methods of connecting any type of computing or communications devices, servers, clusters of servers, using cellular, wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for managing IoT device lifecycle for IoT devices using cellular networks, the method comprising:
   receiving network usage information for one or more devices operating on a cellular network;
   storing network usage information for the one or more devices operating on a cellular network;
   analyzing the stored network usage information for the one or more devices operating on a cellular network as historical network usage information for each of the one or more devices operating on the cellular network;
   determining which of the one or more devices have not used cellular network for a pre-determined period of time, where the pre-determined period of time is learned based on the historical network usage information, or provided as one or more static threshold parameters;
   recommending lifecycle changes for each of the one or more devices that has not used cellular network for the pre-determined period of time; and
   managing cellular subscription for the one or more devices by automatically implementing the recommended life cycle change.

2. The computer implemented method of claim 1, wherein the network usage information includes data usage information including any of: cellular data, SMS data, voice data or a combination thereof.

3. The computer implemented method of claim 1, wherein the network usage information includes cellular authentication data or control plane data.

4. The computer implemented method of claim 1, wherein the pre-determined period of time includes any of: an hour, a day, a week, a month, a year, or a combination thereof.

5. The computer implemented method of claim 1, wherein the recommended lifecycle changes for the one or more devices include any of: suspending the device that has not used cellular network for data transfer for a pre-determined period of time, suspending the device that has not used cellular network for a pre-determined period of time, deactivating the device that has not used cellular network for a pre-determined period of time, deactivating the device that has been suspended for a pre-determined period of time, or a combination thereof.

6. The computer implemented method of claim 1, wherein managing cellular subscription for the one or more devices may be performed as any of: batch processing, stream processing, or a combination thereof.

7. A system for managing IoT device lifecycle for IoT devices using cellular networks having one or more devices operating on a cellular network, a server including a processor and a storage database, wherein
   the server
      receives network usage information for the one or more devices operating on cellular network;

stores network usage information for the one or more devices operating on a cellular network in the storage database;

analyzes the stored network usage information for the one or more devices operating on a cellular network as historical network usage information for each of the one or more devices operating on a cellular network;

determines which of the one or more devices have not used cellular network for a pre-determined period of time, where the pre-determined period of time is learned based on the historical network usage information, or provided as one or more static threshold parameters;

recommends lifecycle changes for each of the one or more devices that have not used cellular network for the pre-determined period of time; and manages cellular subscription for the one or more devices by automatically implementing the recommended life cycle change.

8. The system of claim 7, wherein the network usage information includes data usage information including any of: cellular data, SMS data, voice data, or a combination thereof.

9. The system of claim 7, wherein the network usage information includes cellular authentication data or control plane data.

10. The system of claim 7, wherein the pre-determined period of time includes any of, an hour, a day, a week, a month, a year, or a combination thereof.

11. The system of claim 7, wherein the recommended lifecycle changes for the one or more devices include any of: suspending the device that has not used cellular network for data transfer for a pre-determined period of time, suspending the device that has not used cellular network for a pre-determined period of time, de-activating the device that has not used cellular network for a pre-determined period of time, deactivating the device that have been previously suspended for a pre-determined period of time, or a combination thereof.

12. The system of claim 7, wherein the system manages cellular subscription for the one or more devices as any of: batch processing, stream processing, or a combination thereof.

13. A non-transitory computer-readable medium for managing IoT device lifecycle for IoT devices using cellular networks having executable instructions stored therein that, when executed, cause one or more processors corresponding to a system having a one or more devices operating on a cellular network, a server including a processor and a storage database to perform operations comprising:

receiving network usage information for the one or more devices operating on a cellular network;

storing network usage information for the one or more devices operating on a cellular network;

analyzing the stored network usage information for the one or more devices operating on a cellular network as historical network usage information for each of the one or more devices operating on a cellular network;

determining which of the one or more devices have not used cellular network for a pre-determined period of time, where the pre-determined period of time is learned based on the historical network usage information, or provided as one or more static threshold parameters;

recommending lifecycle changes for each of the one or more devices that have not used cellular network for the pre-determined period of time; and managing cellular subscription for the one or more devices by automatically implementing the recommended life cycle change.

14. The non-transitory computer-readable medium of claim 13, wherein the network usage information includes data usage information including any of: cellular data, SMS data, voice data, or a combination thereof.

15. The non-transitory computer-readable medium of claim 13, wherein the network usage information includes cellular authentication data or control plane data.

16. The non-transitory computer-readable medium of claim 13, wherein the pre-determined period of time includes any of, an hour, a day, a week, a month, a year, or a combination thereof.

17. The non-transitory computer-readable medium of claim 13, wherein the recommended lifecycle changes for the one or more devices include any of: suspending the device that has not used cellular network for data transfer for a pre-determined period of time, suspending the device that has not used cellular network for a pre-determined period of time, de-activating the device that has not used cellular network for a pre-determined period of time, deactivating the device that has been previously suspended for a pre-determined period of time, or a combination thereof.

18. The non-transitory computer-readable medium of claim 13, wherein managing cellular subscription for the one or more devices may be performed as any of: batch processing, stream processing, or a combination thereof.

* * * * *